US005549783A

United States Patent [19]

Schroeder et al.

[11] Patent Number: 5,549,783

[45] Date of Patent: Aug. 27, 1996

[54] APPARATUS AND METHOD FOR AUTOMATICALLY APPLYING ADHESIVE-BACKED LABELS TO MOVING ARTICLES

[75] Inventors: Hubert J. Schroeder, Fullerton; Jovan Zivkovic, Costa Mesa, both of Calif.

[73] Assignee: Apax Corporation, Cerritos, Calif.

[21] Appl. No.: 555,305

[22] Filed: Nov. 8, 1995

Related U.S. Application Data

[63] Continuation of Ser. No. 306,712, Sep. 15, 1994, abandoned, which is a continuation of Ser. No. 117,878, Sep. 7, 1993, Pat. No. 5,399,228, which is a continuation of Ser. No. 839,616, Feb. 21, 1992, abandoned.

[51] Int. Cl.[6] .......... B32B 31/00

[52] U.S. Cl. .......... 156/542; 156/584; 156/361; 193/37; 198/782

[58] Field of Search .......... 156/540, 541, 156/542, 447, 448, 579, 361, 362, 556, 584; 226/96; 193/37; 198/782; 271/33

[56] References Cited

U.S. PATENT DOCUMENTS

| | | | |
|---|---|---|---|
| 1,708,854 | 4/1929 | Stahlhut | 193/35 R |
| 1,772,584 | 8/1930 | Peiler | 198/780 X |
| 2,087,846 | 7/1937 | Jahn | 198/780 X |
| 2,827,153 | 3/1958 | Olk et al. | 193/35 R |
| 3,169,895 | 2/1965 | Sohn | 156/361 |
| 3,321,105 | 5/1967 | Marano | 156/361 X |
| 3,405,021 | 10/1968 | Marano | 156/542 X |
| 3,428,509 | 2/1969 | Messmer | 156/542 X |
| 3,529,757 | 9/1970 | Sharpe | 226/96 X |
| 3,797,423 | 3/1974 | Lopez et al. | 198/780 X |
| 3,853,526 | 12/1974 | Hochart | 198/780 X |
| 3,885,705 | 5/1975 | French | 221/211 |
| 3,888,725 | 6/1975 | French | 156/556 |
| 3,897,293 | 7/1975 | Babcock | 156/519 |
| 3,984,277 | 10/1976 | French et al. | 156/497 |
| 4,024,011 | 5/1977 | Cranshaw et al. | 156/299 |
| 4,046,613 | 9/1977 | Kucheck et al. | 156/249 |
| 4,106,972 | 8/1978 | Caudill | 156/363 |
| 4,120,717 | 10/1978 | Rost | 156/405 R |
| 4,124,429 | 11/1978 | Crankshaw | 156/364 |
| 4,201,621 | 5/1980 | Crankshaw et al. | 156/567 |
| 4,210,484 | 7/1980 | Crankshaw et al. | 156/542 |
| 4,255,220 | 3/1981 | Kucheck et al. | 156/285 |
| 4,261,788 | 4/1981 | McClung | 156/541 |
| 4,314,869 | 2/1982 | Crankshaw | 156/215 |
| 4,337,108 | 6/1982 | Crankshaw et al. | 156/285 |
| 4,366,023 | 12/1982 | Voltmer | 156/361 X |
| 4,374,212 | 2/1983 | Martellock et al. | 523/212 X |
| 4,390,386 | 6/1983 | Bartl | 156/235 |
| 4,473,429 | 9/1984 | Crankshaw | 156/483 |
| 4,475,978 | 10/1984 | Bartl | 156/497 |
| 4,566,933 | 1/1986 | Crankshaw et al. | 156/444 |
| 4,574,027 | 3/1986 | Weinundbrot | 156/542 X |
| 4,612,079 | 9/1986 | Ostrow | 156/497 |
| 4,626,313 | 12/1986 | Karp | 156/541 X |
| 4,685,982 | 8/1987 | Kucheck | 156/64 |
| 4,784,714 | 11/1988 | Shibata | 156/382 X |
| 4,824,516 | 4/1989 | Ishihara et al. | 156/523 |
| 4,830,701 | 5/1989 | Crankshaw et al. | 156/448 |
| 4,844,771 | 7/1989 | Crankshaw et al. | 156/387 |
| 4,892,609 | 1/1990 | Nakanome et al. | 156/405.1 |
| 5,064,330 | 11/1991 | Kumagai | 198/782 X |
| 5,158,640 | 10/1992 | Akiyama | 156/542 |
| 5,198,059 | 3/1993 | Curcio et al. | 156/542 X |
| 5,306,375 | 4/1994 | Leonard | 156/542 X |

FOREIGN PATENT DOCUMENTS

| | | | |
|---|---|---|---|
| 233015 | 7/1988 | Japan | 198/782 |

*Primary Examiner*—James Engel
*Attorney, Agent, or Firm*—Price, Gess & Ubell

[57] ABSTRACT

Pressure-sensitive adhesive-backed labels are carried adhesive back side down on a backing strip. The present method and apparatus completely removes each label from its backing material and then may relocate, manipulate, or hold the label by its adhesive back side before it is attached to a passing article. The apparatus may be arranged to dispense the labels along an axis parallel to the path of travel of the moving article or along an axis that crosses the path of travel of the moving article.

11 Claims, 4 Drawing Sheets

APPARATUS AND METHOD FOR AUTOMATICALLY APPLYING ADHESIVE-BACKED LABELS TO MOVING ARTICLES

This is a Continuation Application of application Ser. No. 08/306,712, filed on Sep. 15, 1994, now abandoned, which is a file wrapper continuation of application Ser. No. 08/117,878, filed on Sep. 7, 1993, issued as U.S. Pat. No. 5,399,228, on Mar. 21, 1995, which is a file wrapper continuation of application Ser. No. 07/839,616, filed Feb. 21, 1992, now abandoned, for an APPARATUS AND METHOD FOR AUTOMATICALLY APPLYING ADHESIVE-BACKED LABELS TO MOVING ARTICLES.

BACKGROUND OF THE INVENTION

1. Field of the Invention

The present invention relates generally to improvements in automatic labeling systems and, more particularly, pertains to new and improved systems for applying pressure-sensitive adhesive labels to articles.

2. Description of Related Art

In the field of automatic label dispensing and applying systems, it has been the practice to handle the label, which has one face covered with pressure-sensitive adhesive, by the other face which has printing thereon, to both maneuver the label into contact with that portion of an article which is to receive the label, and to attach the label to the article.

Generally speaking, these prior art systems utilize differential air pressure, i.e., vacuum or a static charge, to hold the label. Once it has been dispensed from its backing material, the label is held by its face. Some systems apply the label to the article by an air blast. These are generally known as air blow machines. The problem with these machines is that about ¾-inch spacing is used between the label and the article, resulting in a very loose placement of the label on tile article.

Other systems have been developed to try and overcome this shortcoming. They have utilized a combination of the air blow method with a tamp method. Such combination machines utilize an air vacuum to hold the label, physically move the entire label-holding head close to the article, and then blow the label onto the product or article, thereby more closely placing the label on the article.

Other systems, known strictly as tamp systems, hold the label by a static charge and physically place the label on the product. A variation of the tamp machine is a machine that utilizes a wipe-on method wherein only the edge of the label is touched to the article, and the label is pulled off the holding head as the article moves past. The wipe-on method provides for accurate placement of the label on the article.

However, this system requires that the movement of the article past the label-holding head and the speed of dispensing the label must be precisely controlled. Such controlled systems require stepping motors or clutch-and-brake mechanisms to precisely index the dispensing of the labels in synchronism with the speed of the article. If this is not done, the label will be applied in a wrinkled fashion or tear or deform.

SUMMARY OF THE INVENTION

The present invention utilizes the natural cohesiveness of the adhesive back side of each label to hold it in place for attachment to a passing product. Rollers or a belt coated with a nonstick material may be used. Each label is dispensed by removing it from its backing material, directly onto the rollers with its adhesive back side down. The label may be moved by the rollers, if powered, to an application site remote from the dispensing site. At the application site, the label is positioned on a group of freewheeling nonstick roller. The moving product picks up one end of the label by its adhesive side and pulls the label off the rollers as it moves past. A brush or similar mechanism wipes the label onto the package. The nonstick roller label handling mechanism permits tile dispensing of labels at a speed that need not be synchronized to the speed of the moving product. The nonstick rollers act as a speed matching mechanism. Moreover, the nonstick roller mechanism can apply the dispensed labels to the moving product, whether the product movement is parallel to the axis of travel of the predispensed labels or perpendicular to the axis of travel of the predispensed labels.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by tile inventors of carrying out their invention. Various modifications, however, will remain readily apparent to those skilled in the art, since the generic principles of the present invention have been defined herein specifically to provide an improved method and apparatus for automatically applying adhesive-backed labels to moving articles.

Figure 1:
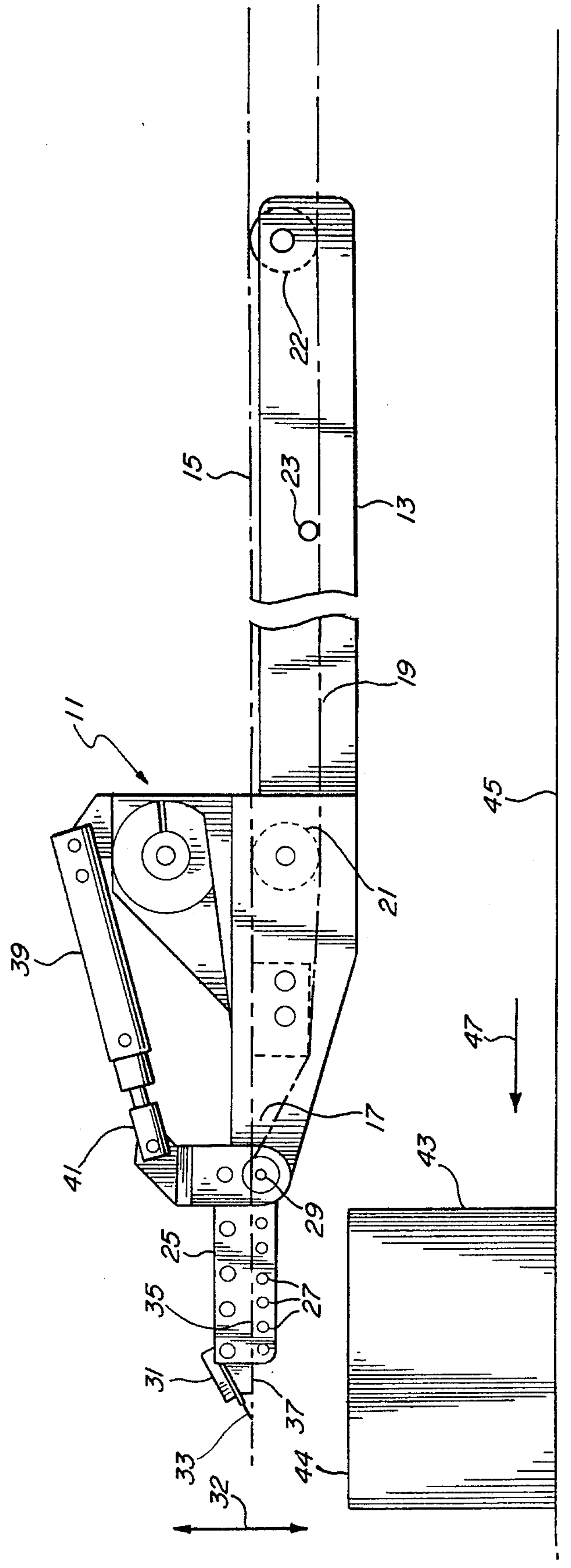
FIG. 1 is a side elevation of the preferred embodiment of the present invention.

A label applicator apparatus 11 according to a preferred embodiment is shown in FIG. 1. The apparatus 11 is similar in many respects to a wipe-on system. Label stock 15, consisting of a plurality of labels with their printed faces up and their sticky back sides against a nonstick liner 19, is fed from a supply reel (not shown) to peel point 17 for dispensing of the label. The liner 19 is gathered up by a take-up reel (not shown) after being peeled away from the dispensed label at peel point 17. A pair of rollers 21, 22 help feed the label stock 15 and liner. Guide roller 23 may be utilized as well. All this is well known in the art.

At the peel point 17, each individual label 35 is dispensed, sticky back side down, printed face up, to a plurality of freely rotating rollers 27 contained within a frame structure 25. Approximately one-eighth to one-half of the length 37 of the dispensed label 35 extends beyond rollers 27. The natural dispensing forces generated at the peel point 17 cause the individual labels 35 to roll across rollers 27 and overhang a substantial length 37 of the rollers.

The sticky back side of each label does not adhere to the surface of the individual rollers because these rollers are covered with an antiadhesive material such as a siliconized cloth, which is readily available on the market. One type of siliconized cloth that has been found satisfactory for this application has been a tape called "Tesaband 4863" manufactured by BDF Tesa Corporation.

The roller frame 25 is attached to the main structure for the labeling mechanism 11 close to the peel point 17 by a rotating pivot shaft 29. This allows the entire roller frame structure 25 to pivot around shaft 29 in an up and down direction 32, as shown.

An article 43 is carried by a conveyor belt 45 in a direction 47 past the roller frame 25. A pneumatic cylinder 39 has its shaft connected to the frame 25 of rollers 27 at a convenient point 41. Actuation of the pneumatic cylinder will cause the frame 25 to pivot around shaft 29, causing the sticky back side 37 of label 35 to come in contact with the top 44 of article 43. As the article continues to move past the dispenser, a brush or squeegee device 33 will simply wipe the label 35 onto the top 44 of article 43 as article 43 pulls the label off rollers 27.

It can be seen that the ability to dispense the individual labels at peel point 17, with their sticky back side down, onto the nonstick rollers 27 as shown, without requiring the use of static or vacuum label pickup devices greatly simplifies the label application apparatus. Moreover, the rollers act as an inherent buffer to compensate for the variation between the label dispensing speed and article speed.

Figure 2:
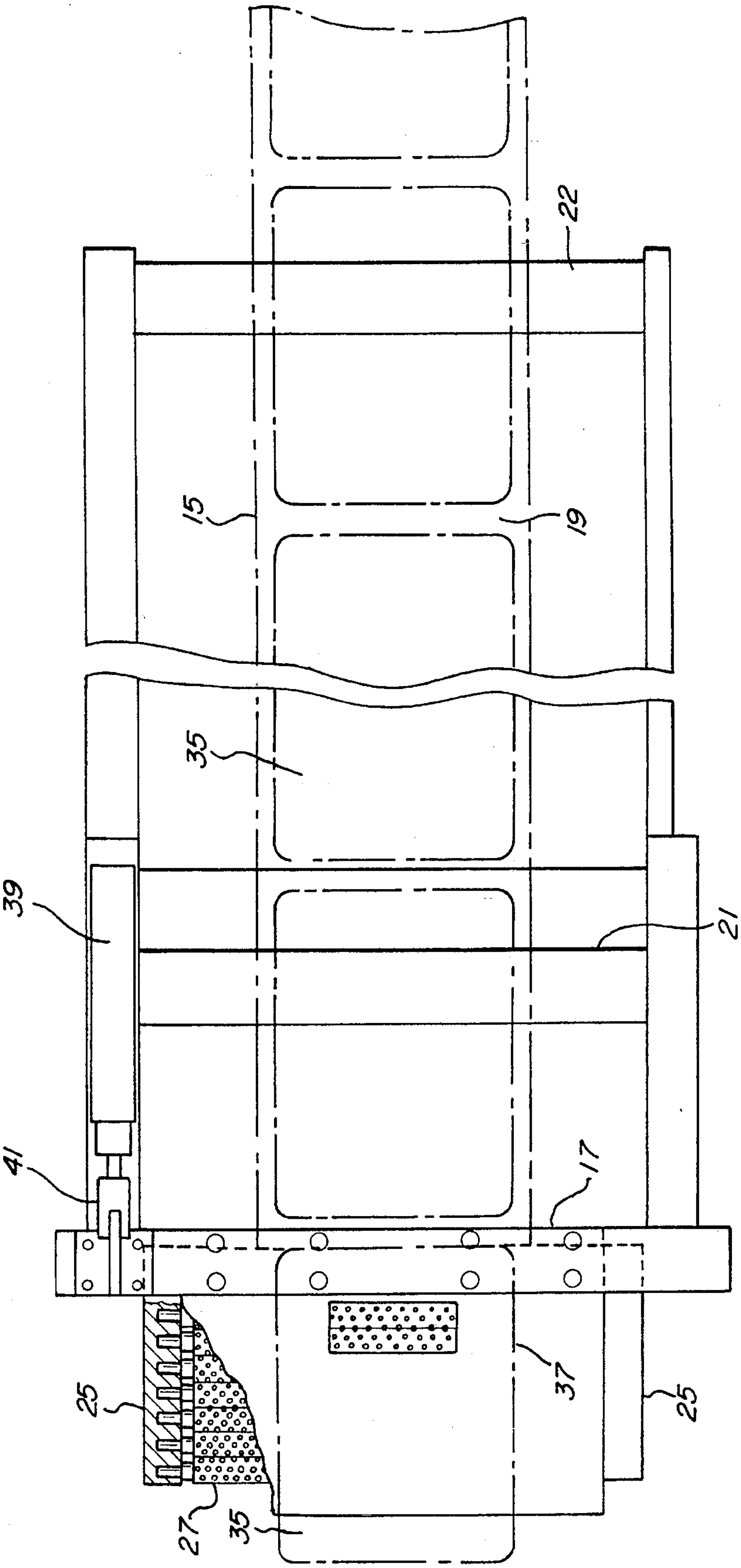
FIG. 2 is a top view of the embodiment of FIG. 1.

FIG. 2 is a top view of FIG. 1, and more clearly illustrates the label stock 15, with a plurality of labels 35 on a nonstick backing material 19 being fed to the peel point 17 of the label dispensing part of apparatus 11.

Nine individual label rollers 27 are shown located in the roller frame 25. The rollers are shown as having a slightly embossed pattern. This is a desirable feature and can be obtained commercially from BDF Tesa Corporation. The number of rollers 27 utilized will depend upon the size (i.e., length) of the labels 35 being dispensed at the peel point 17. It is desirable that about one-eighth to one-half of the label extend beyond the rollers 27 so that its sticky back side 37 can be moved into contact with the article 43 moving past the application site.

Figure 3:
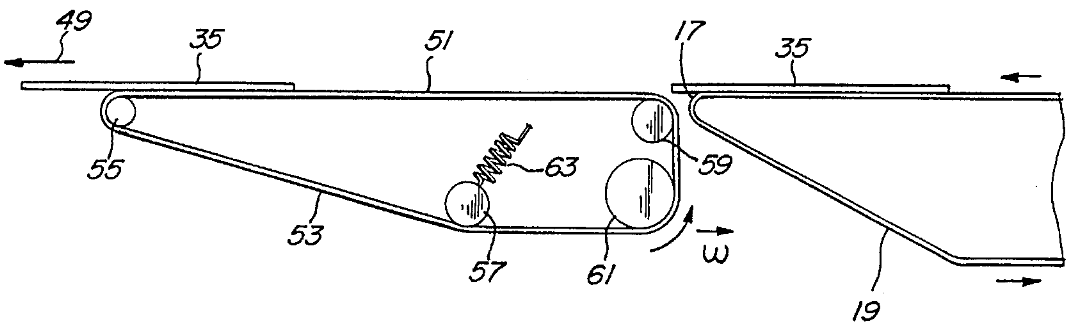
FIG. 3 is a side elevation of all alternate preferred embodiment of the present invention.

FIG. 3 illustrates a preferred alternative embodiment of the invention. The labels 35 being dispensed from the label stock 15 at the peel point 17 are dispensed onto a continuous belt 51 having a nonstick surface of siliconized cloth, for example, the same material as utilized to cover the rollers of FIGS. 1 and 2. The belt 51 could be driven by a drive roller 26, causing the belt to rotate over a series of guide rollers 59 and 55, as well as a tensioning roller 57 biased by a mechanism 63.

The belt 51 is utilized to carry a label 35 quite some distance to the dispensing point at guide roller 55, for example. The label 35 is then brought into contact with an article moving in direction 49, the same direction as label 35, and again wiped onto the article in the manner described above.

Figure 4:
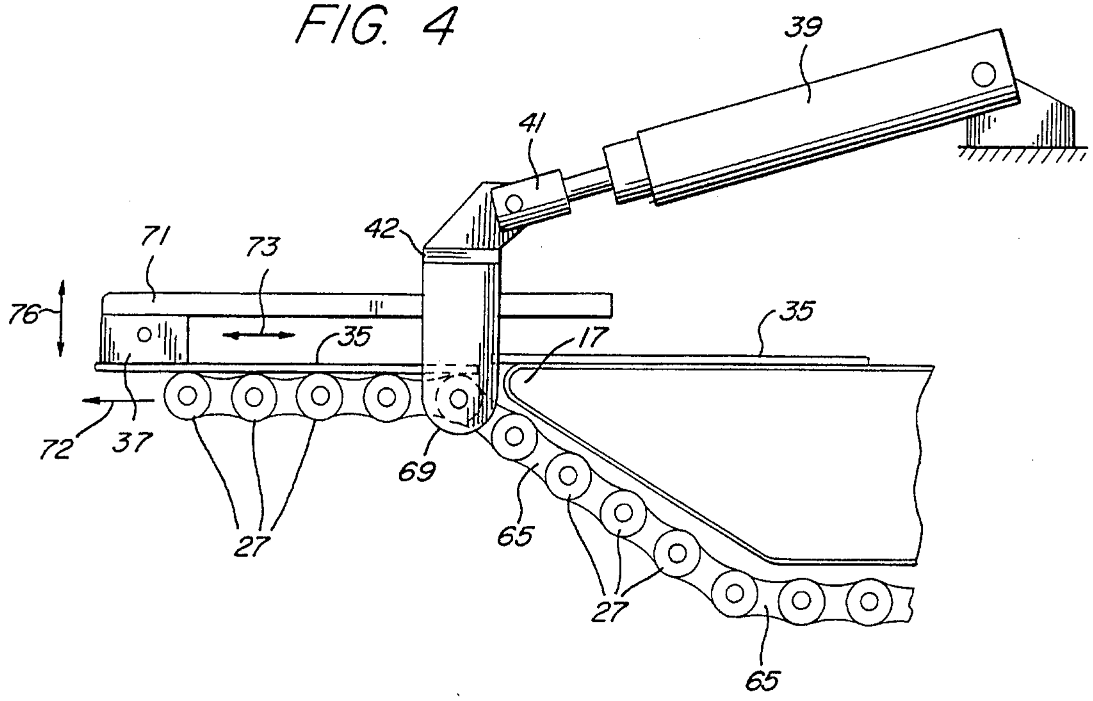
FIG. 4 is a side elevation of another preferred embodiment of the present invention.

FIG. 4 illustrates another alternative preferred embodiment of the present invention wherein a plurality of nonstick surface rollers are contained within a frame 65, which is flexible. Each of the rollers is powered. The structure is devised to permit the length of rollers extending beyond the peel point 17 to be adjustable, as desired, in the direction 73, as shown. The roller support structure 65 is supported by a rod or similar structure 71 that slides back and forth in the direction 73 within a mounting block 42. The length of support rod 71 is matched to the length of the roller frame 65.

Pneumatic cylinder 39 is connected to a support block 42 at a point 41. Support block 42 is, in turn, mounted for pivoting rotation about a shaft 69. Actuation of pneumatic cylinder 39 will cause the entire extended portion of frame 65 to move up and down in the direction 76, and thereby contact the article moving past the dispensing location.

As described earlier, the individual labels 35 are dispensed at peel point 17 onto the nonstick surfaces of rollers 27, with a portion of the label with its sticky back side 37 hanging over rollers 27. As the product moves past the dispensing point in the direction 72, pneumatic cylinder 39 is actuated to cause the sticky back side portion 37 of label 35 to come in contact with the article, and the label is then wiped on as described above.

The advantage of the embodiment of FIG. 4 is that the path of travel of label 35 can be adjusted, as needed, to fit the specific articles being labeled. These powered rollers are also effective to transport the label away from the dispensing point 17 some distance to an application site.

Figure 5:
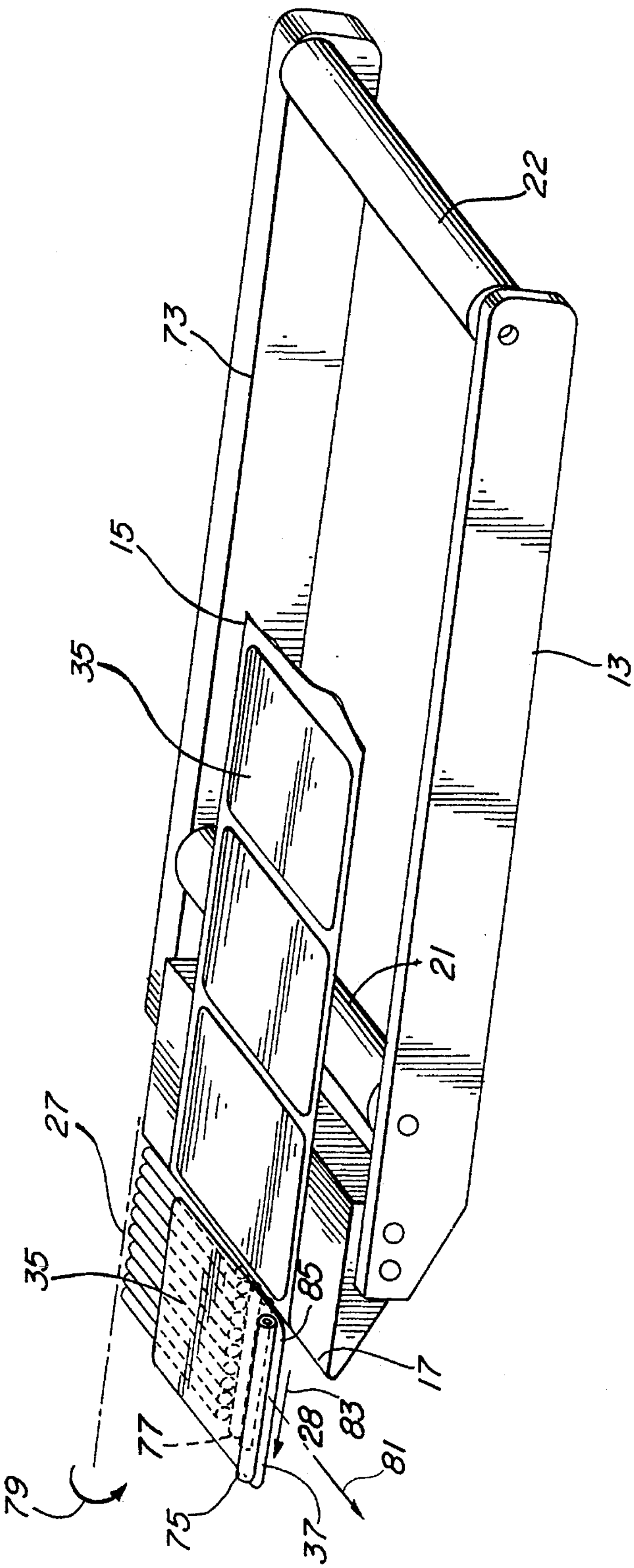
FIG. 5 is a perspective of yet another preferred embodiment of the present invention.

FIG. 5 illustrates yet another alternate preferred embodiment for the present invention, wherein the invention is adapted to apply labels 35 to articles moving in a direction 81, which is transverse to the direction 83 in which the labels are moving.

Label stock 15 with labels 35 thereon moves along in the direction 83 within the dispensing frame 13, 3, along rollers 21, 22 to the peel point 17.

The nonstick surface rollers 27 are located with respect to the peel point 17 and the path of travel of labels 35 so that the leading edge 86 and right side edge 85 of labels 35 overlap rollers 27. Right side edge 85 of label 35 overlaps the ends 28 of rollers 27 and, more particularly, overlaps a pair of transverse direction rollers 77, which have their axes of rotation located perpendicular to the direction of travel 81 of the article to be labeled.

The labels 35 are dispensed at separation point 17 onto rollers 27 so that right side edge 85 has a portion of its sticky back side 39 exposed to the air. Label 35 is dispensed in the direction 83 of travel of the label stock 15. Product which may be moving in a direction 81 perpendicular to direction 83 can be labeled by label 35 simply by causing the entire roller grid 27 to rotate in the direction 79, as indicated. This brings right side edge 85 and its under side 37 in contact with the article, causing the moving article to pull label 35 off the nonstick roller grid 27 with the help of traverse rollers 77.

An impression roller 75 is located on top of label 35 in contact with its printed face 75. Depending on the proximity of the moving product to the dispensing roller grid 27 of the present embodiment, it may be sufficient to simply rotate impression roller 75 in the direction 79 to bring the sticky back side 37 of label 35 in contact with the product.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus for applying pressure-sensitive adhesive labels carried at a first predetermined rate to an article moving at a second predetermined rate, said apparatus comprising:

a label dispensing mechanism:

a label receiving means including a plurality of rollers contained in a frame which is mounted for movement with respect to said label dispensing mechanism, each roller having a nonstick surface, located adjacent said label dispensing mechanism, for receiving a label by its adhesive back side, and for moving the label by its adhesive back side along said roller surface to a waiting position: and means for increasing or decreasing the length from the distal end of the roller frame to the label dispensing mechanism whereby the label is applied to the moving article by moving a portion of said adhesive back side of said label into contact with said moving article while another portion of said adhesive back side remains in contact with said roller surface.

2. The apparatus of claim 1 wherein said plurality of rollers are rotatably contained in a frame mounted for pivotal movement with respect to said label dispensing mechanism.

3. The apparatus of claim 2 further comprising a wiper means on the end of said frame.

4. The apparatus of claim 1 wherein said frame containing a plurality of rollers pivots about an axis perpendicular to the direction each label is dispensed from said dispensing mechanism.

5. The apparatus of claim 1 wherein said frame containing a plurality of rollers pivots about an axis parallel to the direction each label is dispensed from said dispensing mechanism.

6. The apparatus of claim 1 wherein the nonstick covering on each roller comprises siliconized cloth.

7. The apparatus of claim 1 wherein said nonstick covering comprises an embossed pattern.

8. The apparatus of claim 1, wherein each dispensed label is moved a distance greater than the length of the label on said rollers mounted in a surface.

9. The apparatus of claim 8, wherein each label is moved on the rollers at a speed which is different from the dispensing speed.

10. An apparatus for applying pressure-sensitive adhesive labels at a labeling rate, the labels being carried to the site of moving articles to be labeled, said apparatus comprising:

a label dispensing mechanism for separately dispensing each individual label; and a plurality of rollers, each having a nonstick covering, mounted in a surface adjacent said label dispensing mechanism for receiving each individual label by its adhesive back side and moving the label by its adhesive back side along said rollers to a position where a portion of the label extends beyond the roller surface, said rollers mounted for movement in unison with respect to said label dispensing mechanism to increase or decrease the length from the dispensing mechanism to the roller furthest from the dispensing mechanism, so that the label is applied to a moving article by moving the adhesive back side of the portion extending beyond the roller furthest from the dispensing mechanism into contact with said moving article while the rest of the label remains in contact with and is held by said roller surface, the moving article thereby removing the label from the rollers at the speed of the moving article.

11. An apparatus for applying pressure-sensitive adhesive labels carried at a first predetermined rate on a backing material to an article moving at a second predetermined rate, said apparatus comprising:

a label dispensing mechanism for separating each individual label from its backing material; and a plurality of rollers contained in a frame which is mounted for movement along its length with respect to said label dispensing mechanism to increase or decrease the length from the distal end of the roller frame to the label dispensing mechanism, each roller having a nonstick surface thereon located adjacent said label dispensing mechanism, for receiving a label by its adhesive back side, and for moving the label by its adhesive back side along said roller surface to a waiting position.

so that the label is applied to the moving article by moving a portion of said adhesive back side of said label into contact with said moving article while another portion of said adhesive back side remains in contact with said roller surface.

* * * * *